United States Patent
Yang

(10) Patent No.: US 11,518,862 B2
(45) Date of Patent: Dec. 6, 2022

(54) RUBBER-PLASTIC COMPOSITE FOAMED MATERIAL

(71) Applicant: Giant East Technology Co., Ltd, Taichung (TW)

(72) Inventor: Tzu Yu Yang, Taichung (TW)

(73) Assignee: GIANT EAST TECHNOLOGY CO., LTD, Taichung (TW)

( * ) Notice: Subject to any disclaimer, the term of this patent is extended or adjusted under 35 U.S.C. 154(b) by 202 days.

(21) Appl. No.: 16/843,300

(22) Filed: Apr. 8, 2020

(65) Prior Publication Data
US 2021/0317280 A1     Oct. 14, 2021

(51) Int. Cl.
| | |
|---|---|
| *C08J 9/10* | (2006.01) |
| *C08J 9/35* | (2006.01) |
| *C08L 7/00* | (2006.01) |
| *C08L 9/00* | (2006.01) |
| *C08L 11/00* | (2006.01) |
| *C08L 9/06* | (2006.01) |
| *C08J 9/00* | (2006.01) |

(52) U.S. Cl.
CPC ............ *C08J 9/103* (2013.01); *C08J 9/0066* (2013.01); *C08L 7/00* (2013.01); *C08L 9/06* (2013.01); *C08L 11/00* (2013.01); *C08J 2203/04* (2013.01); *C08J 2307/00* (2013.01); *C08J 2309/06* (2013.01); *C08J 2311/00* (2013.01); *C08L 2201/08* (2013.01); *C08L 2203/14* (2013.01); *C08L 2207/322* (2013.01)

(58) Field of Classification Search
CPC ...... C08J 9/103; C08J 9/0066; C08J 2203/04; C08J 2307/00; C08J 2309/06; C08J 2311/00; C08J 2201/026; C08J 2491/00; C08J 9/0061; C08J 9/32; C08L 7/00; C08L 9/06; C08L 11/00; C08L 2201/08; C08L 2203/14; C08L 2207/322
See application file for complete search history.

(56) References Cited

U.S. PATENT DOCUMENTS

| | | | |
|---|---|---|---|
| 7,270,610 B1 * | 9/2007 | Sullivan | ............. A63B 37/0003 473/354 |
| 2013/0165542 A1 * | 6/2013 | Amos | ...................... C08K 7/28 521/143 |
| 2015/0080151 A1 * | 3/2015 | Chen | .................. A63B 37/0039 473/373 |

FOREIGN PATENT DOCUMENTS

CN     109988369 A  *  7/2019

\* cited by examiner

*Primary Examiner* — Kara B Boyle
(74) *Attorney, Agent, or Firm* — Muncy, Geissler, Olds & Lowe, P.C.

(57) ABSTRACT

The rubber-plastic composite foamed material of the present invention is made by mixing and foaming a plurality of components including 100 parts by weight of rubber, 5-70 parts by weight of hollow glass microspheres, 2-25 parts by weight of carbon black, 10-40 parts by weight of softening oil, 10-30 parts by weight of sulfur ointment, 0.5-5 parts by weight of antioxidant, 0.5-10 parts by weight of crosslinking agent and 2-12 parts by weight of foaming agent. By including hollow glass microspheres into the composition, the rubber-plastic composite foamed material of the present invention exhibits better compression resistance and heat retention.

4 Claims, 1 Drawing Sheet

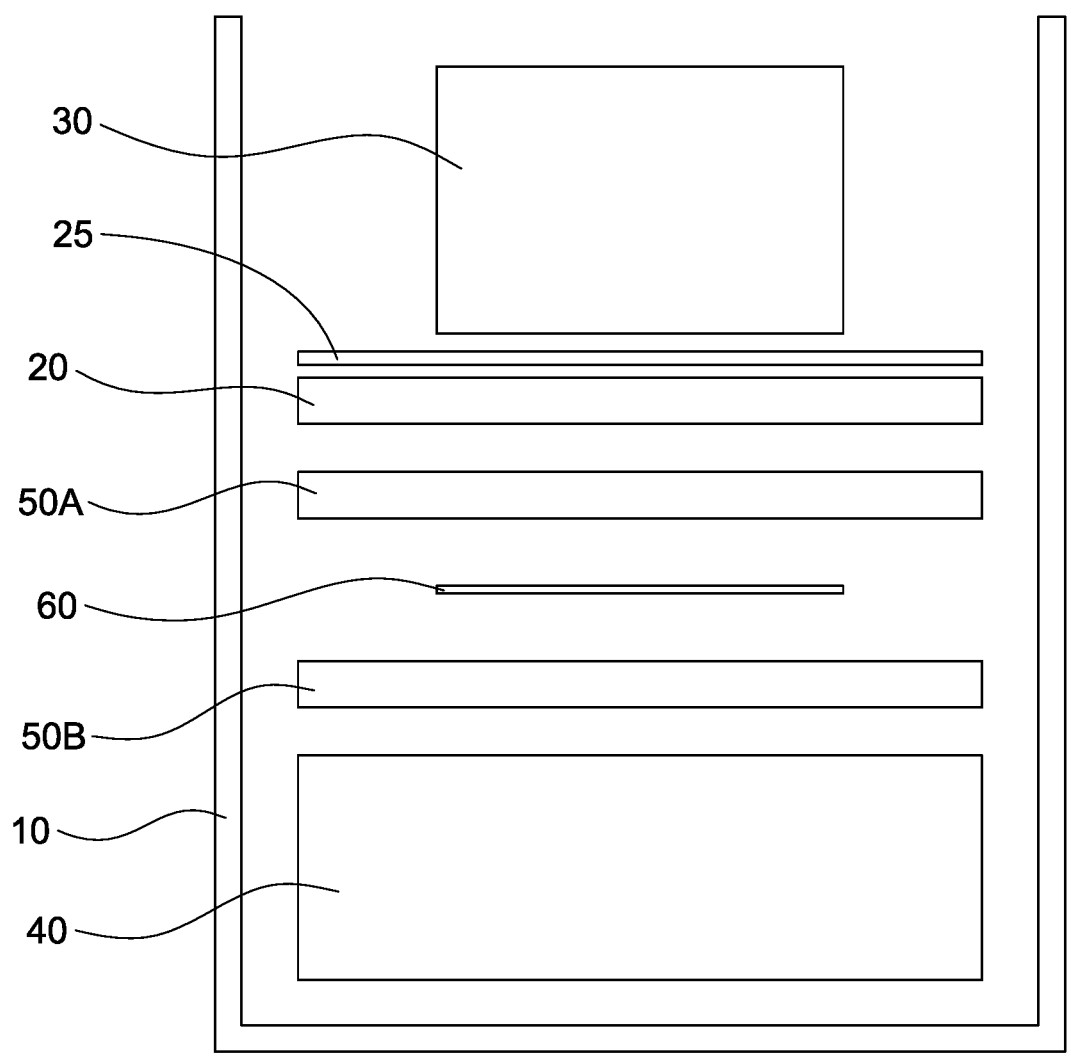

RUBBER-PLASTIC COMPOSITE FOAMED MATERIAL

BACKGROUND OF THE INVENTION

Field of the Invention

The present invention relates generally to a rubber-plastic composite material, and more particularly to a rubber-plastic composite foamed material.

Description of the Prior Art

Rubber-plastic composite foamed materials are lightweight and have low thermal conductivity, and thus they are often used to make wetsuits. It is well known that, during diving activities, the deeper the water, the greater the water pressure. The conventional rubber-plastic composite foamed materials will be compressed under a high water pressure environment, causing compression of the pores in the materials, and thereby reducing the thermal insulatability thereof and speeding up the loss of diver temperature.

Besides, after repeated diving compression, the pores of the conventional rubber-plastic composite materials can be permanently compressed. As a result, the often the conventional rubber-plastic composite materials are used, the worse the thermal insulatability thereof.

SUMMARY OF THE INVENTION

In view of the foregoing, it is an objective of the present invention to provide a rubber-plastic composite foamed material that can have better thermal insulatability under high pressure environment.

To achieve the above and other objectives, the present invention provides a rubber-plastic composite foamed material which is made by mixing and foaming a plurality of components including 100 parts by weight of rubber, 5-70 parts by weight of hollow glass microspheres, 2-25 parts by weight of carbon black, 10-40 parts by weight of softening oil, 10-30 parts by weight of sulfur ointment, 0.5-5 parts by weight of antioxidant, 0.5-10 parts by weight of crosslinking agent and 2-12 parts by weight of foaming agent.

The use of the hollow glass microspheres to replace part of the filler can achieve a beneficial effect in that, even in a high-pressure environment, it can still have a good thermal insulatability and meet the heat retention requirements of wetsuits.

BRIEF DESCRIPTION OF THE DRAWINGS

FIG. 1 is an explosive side view of a thermal insulation testing device used for thermal insulation testing.

DETAILED DESCRIPTION OF THE PREFERRED EMBODIMENTS

The rubber-plastic composite foamed material of the present invention is made by mixing and foaming multiple components, including 100 parts by weight of rubber, 5-70 parts by weight of hollow glass microspheres, 2-25 parts by weight of carbon black, 10-40 parts by weight of softening oil, 10-30 parts by weight of sulfur ointment, 0.5-5 parts by weight of antioxidant, 0.5-10 parts by weight of crosslinking agent and 2-12 parts by weight of foaming agent. In some embodiments, the components further include 0.5-12 parts by weight of active agent. In some embodiments, the components further include 5-40 parts by weight of filler. In some embodiments, the components further include 0.5-1.5 parts by weight of accelerator.

The rubber may be natural rubber or synthetic rubber. In possible embodiments, the rubber may be, but not limited to, chloroprene rubber (CR), nitrile butadiene rubber (NBR), styrene butadiene rubber (SBR), ethylene-propylene-diene monomer rubber (EPDM) and/or ethylene-vinyl acetate rubber (EVA).

The hollow glass microsphere is a hollow sphere made of glass. In possible embodiments, the hollow glass microsphere may be made from silicon dioxide and aluminum oxide, having a D90 particle size between 5-100 µm and a compressive strength higher than 500 psi, which has a low compression deformation rate, such as SY-210 or GES-83 sold by Giant East Technology Co., Ltd. (hollow glass microspheres made from silicon dioxide and aluminum oxide). The larger the diameter of the hollow glass microsphere is, the higher the hollow ratio is, and vice versa. The hollow glass microspheres may have a small thermal conductivity coefficient, for example, less than 0.06 W/(m·K).

As a rubber reinforcing agent, the carbon black can be used to improve the abrasion resistance of rubber. For example, the carbon black may be N550, N774 or N990 sold by Cabot Corporation, US.

The softening oil may be, but not limited to, aromatic oil or naphthenic oil, such as treated distillate aromatic extracts (TDAE), dioctyl terephthalate (DETP), tri-(n-octyl) trimellitate (TOTM), dioctyl sebacate (DOS), or other non-phthalate plasticizers. When processing rubber, the softening oil can soften and plasticize the rubber for easy processing.

The sulfur ointment is a rubber processing aid, such as ointment made by cross-linking castor oil, rapeseed oil and sulfur. The sulfur ointment may be, for example, VVO-74 sulfur ointment manufactured by Oriental Silicas Corporation, TW, or Brown-30 sulfur ointment manufactured by Tenma Factice Mfg. Co., Ltd., JP.

The antioxidant may be, for example, a copolymer of p-cresol and dicyclopentadiene, 4,4'-bis(phenylisopropyl) diphenylamine, 4,4'-dioctylphenylamine, 1,2-dihydro-2,2,4-trimethyl-quinolin or 2,2'-methylenebis(4-methyl-6-tert-butylphenol).

The crosslinking agent may be, for example, magnesium oxide (MgO), zinc oxide (ZnO) or sulfur, and may be used together with the accelerator, such as diphenylguanidine, 2-mercapto benzothiazole, dibenzothiazole disulfide or zinc dibutyl dithiocarbamate.

The foaming agent may be, for example, azodicarbonamide or 4,4'-Oxybis(benzenesulfonyl hydrazide).

The active agent may be, for example, poly(ethylene glycol), diethylene glycol, triethanolamine, stearic acid and/or silane.

The filler may be, for example, white carbon black (a precipitated silica), calcium carbonate, magnesium-modified powder (a mixture of talc and magnesium oxide), talc powder, mica powder or kaolin clay powder.

Embodiments of the present invention and a comparative example are shown below and the present invention will be specifically described.

TABLE 1

| Components | | Chemical or trade names |
|---|---|---|
| Rubber | a | CR |
| | b | SBR |
| | c | Natural rubber |

TABLE 1-continued

| Components | | Chemical or trade names |
|---|---|---|
| Hollow glass microspheres | a | SY-210 (manufactured by Giant East Technology Co., Ltd.) |
| | b | GES-83 (manufactured by Giant East Technology Co., Ltd.) |
| Carbon Black | | N774 (manufactured by Cabot Corporation, US) |
| Filler | a | Calcium carbonate |
| | b | Talc powder |
| | c | Kaolin clay powder | the foaming agent into the kneader, mix for 2-10 minutes at 65-90° C.; feed the mixture in the kneader to a double-roller mixer and mix for 2-25 minutes, then put the mixture into a calender to turn into a rubber-plastic sheet; put the rubber-plastic sheet into a first hydraulic press for the first foaming for 10-30 minutes at 125-150° C.; take out the rubber-plastic sheet from the first hydraulic press, then put it into a second hydraulic press for the second foaming for 10-30 minutes at 130-170° C.; after the second foaming, the rubber-plastic sheet is taken out and cooled for several days, and finally the required rubber-plastic composite foamed material is cut out by a slicer.

TABLE 2

| Components and parts by weight | | Embodiments | | | | | | | | Comp. Example |
|---|---|---|---|---|---|---|---|---|---|---|
| | | 1 | 2 | 3 | 4 | 5 | 6 | 7 | 8 | 1 |
| Rubber | a | 100 | 100 | 100 | 100 | 100 | 100 | | | 100 |
| | b | | | | | | | 100 | | |
| | c | | | | | | | | 100 | |
| Hollow glass microspheres | a | | 20 | | 30 | 45 | 60 | 30 | 30 | |
| | b | 5 | | 20 | | | | | | |
| Carbon black | | 30 | 15 | 15 | 15 | 10 | 10 | 30 | 30 | 30 |
| Filler | a | 15 | 5 | 5 | 3 | 3 | | 3 | 3 | 20 |
| | b | 10 | | | | | | | | 10 |
| | c | 10 | 10 | 10 | 2 | 2 | | 2 | 2 | 10 |
| Softening oil | a | 8 | 20 | 20 | 22 | 25 | 25 | 10 | 10 | 8 |
| | b | 22 | 16 | 16 | 16 | 16 | 25 | 20 | 20 | 22 |
| Sulfur ointment | | 25 | 20 | 20 | 20 | 25 | 30 | 20 | 20 | 25 |
| Antioxidant | | 2 | 2 | 2 | 2 | 2 | 2 | 2 | 10 | 2 |
| Active agent | a | | 3 | 3 | 4 | 5 | 6 | 4 | 4 | |
| | b | 1 | 1 | 1 | 1 | 1 | 1 | 1 | 1 | 1 |
| Accelerator | a | | | | | | | 0.7 | 0.3 | |
| | b | | | | | | | 0.3 | 0.2 | |
| | c | | | | | | | 0.1 | 0.1 | |
| Crosslinking agent | a | 4 | 4 | 4 | 4 | 4 | 4 | | | 4 |
| | b | 5 | 5 | 5 | 5 | 5 | 5 | | | 5 |
| | c | | | | | | | 1.5 | 2 | |
| Foaming agent | | 9 | 7 | 7 | 6 | 5 | 4 | 10 | 10 | 10 |

TABLE 1-continued

| Components | | Chemical or trade names |
|---|---|---|
| Soften oil | a | TDAE V-500 (an aromatic processing oil manufactured by Hansen und Rosenthal Group) |
| | b | NA-80 (a naphthenic processing oil manufactured by Total Group) |
| Sulfur ointment | | VVO-74 (manufactured by Oriental Silicas Corporation, TW) |
| Antioxidant | | 4,4'-bis(phenylisopropyl)diphenylamine |
| Active agent | a | Poly(ethylene glycol) (PEG4000) |
| | b | Stearic acid |
| Accelerator | a | Diphenylguanidine |
| | b | 2-mercapto benzothiazole |
| | c | Dibenzothiazole disulfide |
| Crosslinking agent | a | MgO |
| | b | ZnO |
| | c | Sulfur |
| Foaming agent | | Azodicarbonamide |

EMBODIMENTS 1-8 AND COMPARATIVE EXAMPLE 1

According to the ratio shown in Table 2, put the rubber into a kneader for 0.5-5 minutes at 30-50° C.; add the antioxidant, the active agent, the carbon black, the hollow glass microspheres and a part of the required amount of the softening oil into the kneader, mix for 2-10 minutes at 40-70° C.; add the filler, the sulfur ointment, the accelerator and the rest of the softening oil into the kneader, mix for 2-10 minutes at 50-75° C.; add the crosslinking agent and Evaluations:

(1) Hardness

Embodiments 1-8 and Comparative Example 1 were tested with a Type C hardness tester.

(2) Specific Gravity

Embodiments 1-8 and Comparative Example 1 were tested by the test method of ASTM D297.

(3) Tensile Strength

Embodiments 1-8 and Comparative Example 1 were tested by the test method of ASTM D412.

(4) Elongation at Break

Embodiments 1-8 and Comparative Example 1 were tested by the test method of ASTM D638.

(5) Compression Deformation Rate

Embodiments 1-8 and Comparative Example 1 were tested by the test method of ASTM D395.

(6) Thermal Insulatability

The temperature difference between Embodiments 1-8 and Comparative Example 1 was observed under a high-pressure environment.

◎: Compared with Comparative Example 1, the temperature difference>4° C.

○: Compared with Comparative Example 1, the temperature difference=2-4° C.

Δ: Compared with Comparative Example 1, the temperature difference=1-2° C.

X: Compared with Comparative Example 1, the temperature difference<1° C.

(7) Compression Resistance

Embodiments 1-8 and Comparative Example 1 were tested by the test method of ASTM D395.

◉: <40
◯: 40-50
Δ: 50-60
X: >60

The results of the above evaluations are summarized in Table 3.

TABLE 3

| Evaluations | Embodiments | | | | | | | | Comp. Example |
|---|---|---|---|---|---|---|---|---|---|
| | 1 | 2 | 3 | 4 | 5 | 6 | 7 | 8 | 1 |
| Hardness | 10 | 10 | 10 | 10 | 11 | 11 | 11 | 10 | 11 |
| Specific gravity | 0.175 | 0.183 | 0.185 | 0.194 | 0.209 | 0.218 | 0.165 | 0.167 | 0.161 |
| Tensile strength | 9.5 | 13.1 | 12.5 | 11.9 | 10.1 | 8.2 | 7.6 | 8.5 | 9.4 |
| Elongation at break | 510 | 612 | 596 | 650 | 519 | 476 | 295 | 431 | 502 |
| Compression deformation rate | 53.5 | 39.3 | 39.2 | 34.1 | 32.8 | 31.2 | 63.6 | 62.5 | 54.7 |
| Thermal insulatability | Δ | ◉ | ◉ | ◉ | ◉ | ◉ | ◯ | ◯ | — |
| Compression resistance | Δ | ◉ | ◉ | ◉ | ◉ | ◉ | X | X | Δ |

From the results shown in Table 3, it can be noticed that the performances of the rubber-plastic composite foamed material of Embodiments 1-6 of the present invention are similar to those of the conventional material (Comparative Example 1) in hardness, specific gravity, tensile strength and elongation at break. The compression deformation rate and the thermal insulatability of Embodiments 1-6 are better than those of the conventional material. Especially, Embodiments 2-6, whose components includes 20-60 parts by weight of hollow glass microspheres, show much better thermal insulatabilities than Comparative Example 1. On the other hand, Embodiments 7 and 8, using different rubber component, though have poor compression resistance, the thermal insulatabilities thereof are still better than Comparative Example 1.

Thermal insulation test 1 under high-pressure environment:

(1) Instant Thermal Insulatability

Test method: The test is performed using a thermal insulation testing device as shown in FIG. 1, which includes a bucket 10, a K-Type electronic temperature sensor, an acrylic plate 20, an iron sheet 25 and a 25 kg iron block 30. During the test, put the ice block 40 in the bucket 10, and sandwich a flat temperature-sensing wire 60 of the electronic temperature sensor with two pieces of robber-plastic composite foamed materials 50A and 50B for testing. The upper rubber-plastic composite foamed material 50A is covered with the 3 mm-thick acrylic plate 20, and the 3 mm-thick iron sheet 25 is placed above the acrylic sheet 20. Finally, the iron block 30 is placed on the iron sheet 25. The weight of the iron block 30 is evenly distributed to the complete surface of the rubber-plastic composite foamed materials 50A and 50B via the iron sheet 25 and the acrylic plate 20, which simulates the situation that the rubber-plastic composite foamed materials are bearing water pressure in a low temperature environment during diving. Record the prior-test temperature measured by the flat temperature-sensing wire 60 right before the test starts. One minute after the test starts, record the test temperature measured by the temperature-sensing wire 60 again, and calculate the difference between the test temperature and the prior-test temperature.

Test object: Cut the rubber-plastic composite foamed material of Embodiment 3 into a 5 mm-thick sheet as Embodiment 9, and cut the rubber-plastic composite foamed material of Embodiment 3 into a 3 mm-thick sheet as Embodiment 10. The rubber-plastic composite foamed material of Comparative Example 1 was cut into a 5 mm thick sheet as Comparative Example 2.

◉: Temperature difference=10-13° C.
◯: Temperature difference=13-16° C.
Δ: Temperature difference=16-20° C.
X: Temperature difference >20° C.

(2) Long-Term Thermal Insulatability

Test method: Use the device and conditions similar to the instant thermal insulatability test, but obtain the test temperature 30 minutes after the test starts instead.

Test object: Embodiments 9 and 10 and Comparative Example 2.

◉: Temperature difference=10-13° C.
◯: Temperature difference=13-16° C.
Δ: Temperature difference=16-20° C.
X: Temperature difference >20° C.

The results of the above tests are summarized in Table 4.

TABLE 4

| | Embodiments | | Comp. Example |
|---|---|---|---|
| Evaluations | 9 | 10 | 2 |
| Prior-test temp. | 31° C. | 30.8° C. | 30.8° C. |
| Instant thermal insulatability | ◉ | Δ | Δ |
| Longterm thermal insulatability | Δ | Δ | X |

From the results shown in Table 4, it can be noticed that, compared with Comparative Example 2 having the same thickness, Embodiment 9 showed better instant and long-term thermal insulatabilities. Moreover, the results of Embodiment 10 show that the rubber-plastic composite foamed material of the present invention can exhibit similar or even better thermal insulatability even if the thickness thereof is thinner.

Thermal insulation test 2 under high-pressure environment:
(1) Instant Thermal Insulatability
Test method: Same as the thermal insulation test 1.
Test object: Cut the rubber-plastic composite foamed material of Embodiment 4 into a 3.5 mm-thick sheet as Embodiment 11. The rubber-plastic composite foamed material of Comparative Example 1 was cut into a 5 mm thick sheet as Comparative Example 3.
◉: Temperature difference=10-13° C.
○: Temperature difference=13-16° C.
Δ: Temperature difference=16-20° C.
X: Temperature difference >20° C.
(2) Longterm Thermal Insulatability
Test method: Same as the thermal insulation test 1.
Test object: Embodiment 11 and Comparative Example 3.
◉: Temperature difference=10-13° C.
○: Temperature difference=13-16° C.
Δ: Temperature difference=16-20° C.
X: Temperature difference >20° C.
The results of the above tests are summarized in Table 5.

TABLE 5

| Evaluations | Embodiment 11 | Comp. Example 3 |
|---|---|---|
| Prior-test temp. | 23.9° C. | 23.9° C. |
| Instant thermal insulatability | ◉ | ○ |
| Longterm thermal insulatability | ○ | ○ |

From the results shown in Table 5, it can be noticed that the rubber-plastic composite foamed material of the present invention can exhibit excellent thermal insulation properties even if the thickness thereof is thinner.

In summary, the rubber-plastic composite foamed material of the present invention can exhibit good compression resistance and reduce the conduction of thermal energy in the material under a high-pressure environment, and thus exhibits better thermal insulation properties and is suitable for application in wetsuit products.

What is claimed is:

1. A rubber-plastic composite foamed material, which is made by mixing and foaming a plurality of components comprising:
   100 parts by weight of rubber, the rubber being selected from the group consisting of natural rubber and synthetic rubber, the synthetic rubber being selected from the group consisting of chloroprene rubber, nitrile butadiene rubber, styrene butadiene rubber, ethylene-propylene-diene monomer rubber, ethylene-vinyl acetate rubber and mixtures thereof;
   5-60 parts by weight of hollow glass microspheres, wherein the hollow glass microspheres have a compressive strength higher than 500 psi and a $D_{90}$ particle size between 5-100 μm;
   1-30 or 55 parts by weight of carbon black;
   6-50 parts by weight of softening oil, the softening oil being selected from the group consisting of treated distillate aromatic extracts, dioctyl terephthalate, tri-(n-octyl) trimellitate, dioctyl sebacate and mixtures thereof;
   1-50 parts by weight of sulfur ointment, the sulfur ointment being an ointment made by cross-linking castor oil, rapeseed oil and sulfur;
   0.5-10 parts by weight of antioxidant, the antioxidant being selected from the group consisting of a copolymer of p-cresol and dicyclopentadiene, 4,4'-bis(phenylisopropyl)diphenylamine, 4,4'-dioctylphenylamine, 1,2-dihydro-2,2,4-trimethyl-quinolin and 2,2'-methylenebis(4-methyl-6-tert-butylphenol);
   1.5-15 parts by weight of crosslinking agent, the crosslinking agent being selected from the group consisting of magnesium oxide, zinc oxide and sulfur; and
   4-10 parts by weight of foaming agent, the foaming agent being selected from the group consisting of azodicarbonamide and 4,4'-Oxybis(benzenesulfonyl hydrazide).

2. The rubber-plastic composite foamed material of claim 1, wherein the components further comprise 0.5-12 parts by weight of active agent, the active agent being selected from the group consisting of poly(ethylene glycol), diethylene glycol, triethanolamine, stearic acid, silane and mixtures thereof.

3. The rubber-plastic composite foamed material of claim 1, wherein the components further comprise 5-40 parts by weight of filler, the filler being selected from the group consisting of white carbon black, calcium carbonate, magnesium-modified powder, talc powder, mica powder, kaolin clay powder and mixtures thereof.

4. The rubber-plastic composite foamed material of claim 1, wherein the components further comprise 0.5-1.5 parts by weight of accelerator, the accelerator being selected from the group consisting of diphenylguanidine, 2-mercapto benzothiazole, dibenzothiazole disulfide, zinc dibutyl dithiocarbamate and mixtures thereof.

* * * * *